G. P. HERNDON.
Ice-Cream Freezers.

No. 156,792. Patented Nov. 10, 1874.

WITNESSES
Henry N. Miller
C. L. Eueth

INVENTOR
Geo. P. Herndon,
per Alexander Mason,
Attorneys

UNITED STATES PATENT OFFICE.

GEORGE P. HERNDON, OF ROME, GEORGIA.

IMPROVEMENT IN ICE-CREAM FREEZERS.

Specification forming part of Letters Patent No. 156,792, dated November 10, 1874; application filed August 4, 1874.

*To all whom it may concern:*

Be it known that I, GEORGE P. HERNDON, of Rome, in the county of Floyd and in the State of Georgia, have invented certain new and useful Improvements in Ice-Cream Freezers; and do hereby declare that the following is a full, clear, and exact description thereof, reference being had to the accompanying drawings and to the letters of reference marked thereon, making a part of this specification.

My invention has for its object to furnish an improved automatic ice-cream freezer, which will produce hard-frozen cream without any labor; and it consists in the construction and combination of devices, as will be hereinafter more fully set forth.

In order to enable others skilled in the art to which my invention appertains to make and use the same, I will now proceed to describe its construction and operation, referring to the annexed drawing, in which—

Figure 1:
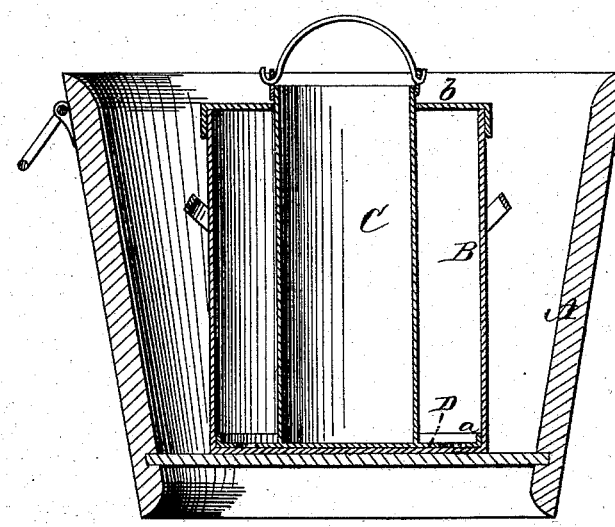
Figure 2:
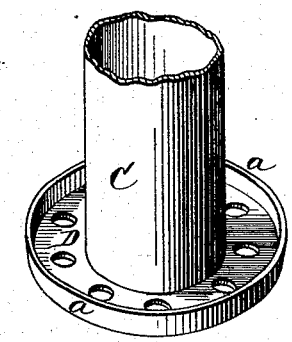

Figure 1 is a longitudinal vertical section of my ice-cream freezer. Fig. 2 is a perspective view of the lower end of the vessel containing the inner freezing mixture.

A represents a wooden vessel, of suitable size and shape for containing the outer freezing mixture. B is the metal cream-holder, and C is a metal vessel for containing the inner freezing mixture. The bottom of the vessel C is extended to form a disk, D, which fits up to the inside of the cream-holder B. This disk, outside of the vessel C, is perforated, as shown, and provided around its outer edge with an upward-projecting rim or flange, a.

In practical operation the holder B will be filled a little more than three-fourths full of cream, and the space between it and the interior of the vessel A is filled with ice, or other suitable freezing mixture, to a point as high as the cream. The vessel C, which should contain less than one-fourth the amount of the vessel B, is then filled with ice, or other freezing mixture, and immersed in the holder B, and a lid, b, closely fitted over the cream-holder. A thin stratum of cream is thus formed between the vessels B and C, and the action of the ice on the outer surface of the cream from the ice-box A, and on the inner surface from the ice-box C, chills or freezes the cream hard in from four to five minutes.

The apparatus should merely be set upon a table or stand until frozen, when the lid b is removed and the vessel C drawn out, with the hard-frozen cream clinging solidly to it, the flange a on the disk D scraping the inner sides of the holder.

Having thus fully described my invention, what I claim as new, and desire to secure by Letters Patent, is—

In combination with the ice-holding vessel A and the cream-holding vessel B, having a lid, b, the inner vessel C, provided with a flanged and perforated disk, D a, at its bottom, which disk is of a size to closely hug the inner walls of the vessel B, as set forth.

In testimony that I claim the foregoing I have hereunto set my hand this 11th day of July, 1874.

GEORGE P. HERNDON.

Witnesses:
M. A. LINTON,
B. R. CHAMBERS.